United States Patent [19]
Bouldin et al.

[11] Patent Number: 6,056,327
[45] Date of Patent: May 2, 2000

[54] HIGH PRESSURE HYDRAULIC LINE CONNECTOR

[75] Inventors: Brett Bouldin, Spring; Napoleon Arizmendi, Magnolia, both of Tex.

[73] Assignee: Pes, Inc., The Woodlands, Tex.

[21] Appl. No.: 09/103,675

[22] Filed: Jun. 23, 1998

[51] Int. Cl.[7] ............................. F16L 15/04; F16L 17/08
[52] U.S. Cl. ......................... 285/93; 285/353; 285/351; 285/342; 285/917
[58] Field of Search ............................. 285/93, 351, 353, 285/917, 339, 342, 49

[56] References Cited

U.S. PATENT DOCUMENTS

| | | | |
|---|---|---|---|
| 2,956,823 | 10/1960 | Benjamin | 285/351 |
| 3,695,642 | 10/1972 | DeWoody | 285/351 |
| 4,281,679 | 8/1981 | Stearns | 285/353 |
| 4,553,776 | 11/1985 | Dodd | 285/351 |
| 4,712,813 | 12/1987 | Passerell et al. | 285/351 |
| 5,314,209 | 5/1994 | Kuhne | 285/351 |

FOREIGN PATENT DOCUMENTS 0839143  5/1952  Germany ............................. 285/351

*Primary Examiner*—Erik K. Nicholson

[57] ABSTRACT

A high pressure connector for engagement with a hydraulic conduit for use in high pressure conditions such as downhole in a wellbore. A housing for receiving a conduit end is attachable to a primary retainer. A primary seal and a second seal are positioned between the primary retainer and the housing to provide redundant sealing capabilities. A secondary retainer holds a third seal against the primary retainer. The third seal provides redundant sealing capability and further provides a secondary gripping connection along the conduit length. The secondary gripping connection provides greater tensile strength and reduces the impact of conduit vibration. A test apparatus can be adapted to test the primary seal and the second and third seals before the connector is installed downhole in the well or other high pressure environment.

13 Claims, 4 Drawing Sheets

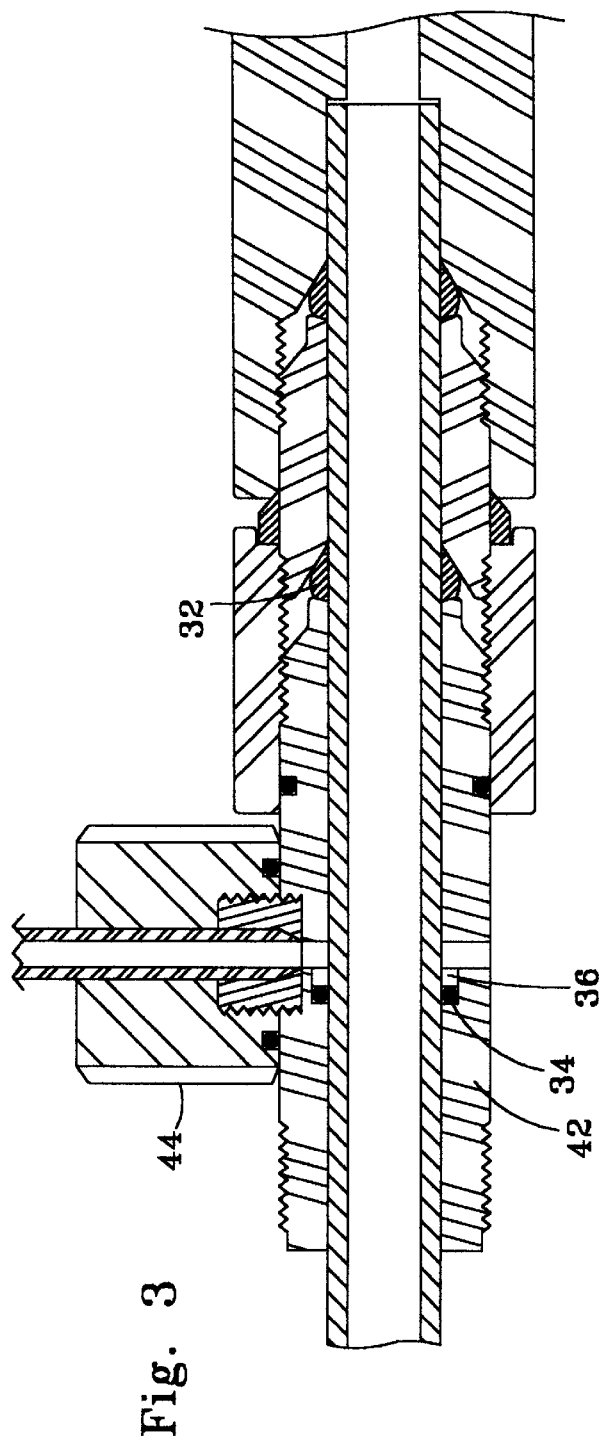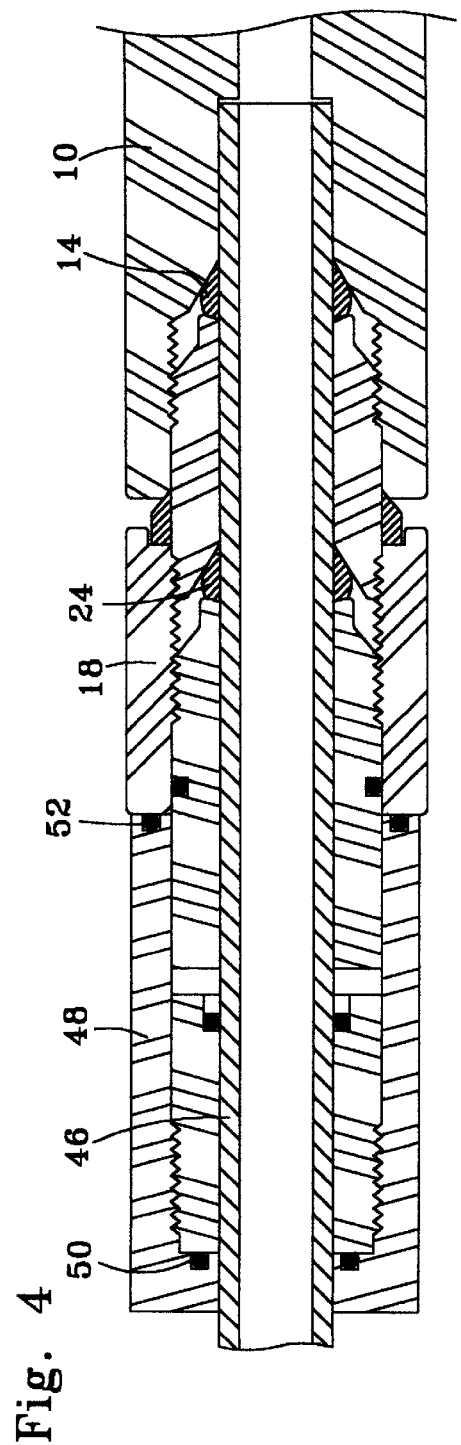

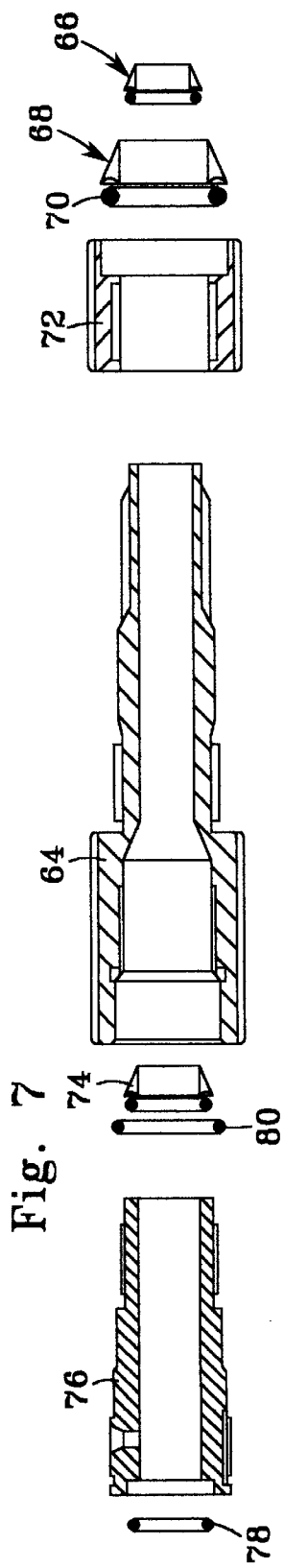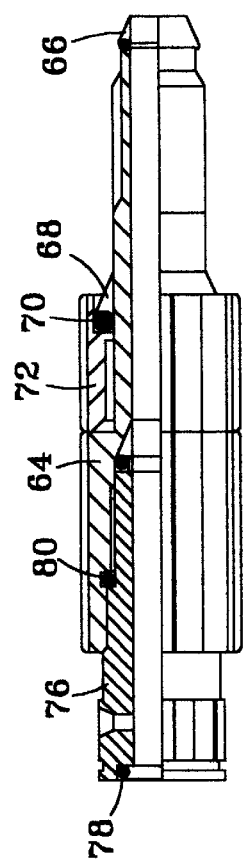

HIGH PRESSURE HYDRAULIC LINE CONNECTOR

BACKGROUND OF THE INVENTION

The present invention relates to the field of high pressure connectors for hydraulic lines. More particularly, the invention relates to a hydraulic conduit connector having backup seal and test capabilities for preventing intrusion of highly pressurized fluids into the hydraulic conduit interior.

Hydraulic conduits or lines are installed in hydrocarbon producing wells to provide hydraulic power for operating downhole well equipment. High pressures and temperatures of the external wellbore fluids require hydraulic line connectors resistant to failure. The connectors should withstand wear, temperature expansion and temperature cycling without permitting intrusion of external wellbore fluids into the hydraulic lines, or of escape of hydraulic fluid into the wellbore. The connectors must also withstand vibrations induced by high pressure gas flow or liquid flow past the tubing exterior surfaces. In standard connection systems, bending stresses on tubing imposed by excessive vibration may cause premature fatigue tubing failure. Although tapered seals and gland nuts have been used to move the stress concentration to unthreaded tubing sections, such vibration resistant connections do not provide fluid tight seals.

Various connectors provide fluid tight seals between tubing and downhole well tools. Conventional hydraulic connector attach tubing to an oversized plug. The plug is attached to a compression nut, and a ferrule provides metal to metal contact between the plug and the compression nut. The compression nut is substantially larger than the tubing, and the bushing, ferrule and multiple seals can fail under high pressure. The overall plug dimension for this connector is long when compared to the tubing diameter, and such configuration effectively prevents the connection from being positioned transversely in a confined space such as a downhole well casing. This oversize dimension is also undesirable because the connector creates an additional obstruction in the well.

Various efforts have been made to overcome limitations of conventional connectors. For example, U.S. Pat. No. 4,553,776 to Dodd (1985) disclosed a high pressure connector for attachment to a small diameter tubing. A first locking nut compressed a packing gland and metal packing rings with a body element recess, and a second packing nut compressed metal ferrules to connect the first tubing end to the first locking nut. Although four sealing surfaces were created by this configuration, the interdependency of the sealing elements required precision machining for each component. The connector cannot fit within narrowly confined spaces and is expensive to manufacture. Slight machining errors, subsequent damage to the sealing components, or improper assembly of the components can cause failure of the connection because of the limited design tolerances.

Another limitation of conventional tubing connections is the inability to effectively test the connection before the tubing connection is installed in a remote location such as a wellbore. After the connections are made up, the entire line must be pressure tested to verify the absence of tubing fluid leaks. Convenient techniques for pressure testing a single connector are not easily performed in a field environment.

Accordingly, a need exists for an improved high pressure hydraulic line connector providing a seal system capable of withstanding high fluid pressures and temperatures. The connector should not create obstructions within enclosed spaces, should be sufficiently short to permit transverse well connections, and should permit pressure testing of the connector before the connector is installed in the well. The connector should also be capable of handling long tubing strings and should withstand fluid flow induced vibration forces acting on such tubing.

SUMMARY OF THE INVENTION

The present invention provides a high pressure connector for engagement with a conduit operable in contact with a pressurized fluid. The invention comprises a housing having a recess for receiving the conduit, a primary seal for contacting said housing and the conduit, a second seal for contacting the housing and the conduit, and a primary retainer engagable with the housing for anchoring the conduit to the housing by urging the primary seal and the second seal into contact with the housing and the conduit to prevent fluid migration therebetween. A third seal for anchoring the conduit to the primary retainer and for isolating said primary seal from the pressurized fluid is included, and a secondary retainer is engagable with the primary retainer for urging the third seal into engagement with the conduit and the primary retainer.

In other embodiments of the invention, a test attachment can be engaged to test the sealing effectiveness of the primary seal and the second or third seals. One or more of the seals can be metallic, and the second and third seals can be resistant to degradation induced by the pressurized fluid. The radial diameter of the primary retainer can be equal to or less than that of the housing, and the radial diameter of the secondary retainer can be equal to or less than that of the primary retainer.

BRIEF DESCRIPTION OF THE DRAWINGS

FIG. 3 illustrates a test attachment engaged with the secondary retainer.

FIG. 4 illustrates a test attachment engaged with the secondary retainer.

FIG. 7 illustrates an expanded view for primary and secondary retainers.

FIG. 8 illustrates an assembled view of the primary and secondary retainers.

FIG. 9 illustrates an end view of connectors featuring a spline outside diameter and turning wrench.

DESCRIPTION OF THE PREFERRED EMBODIMENTS

The present invention provides a significant advance over prior art hydraulic connectors by providing a reliable, high pressure hydraulic connector for use downhole in wells and other confined spaces. The invention incorporates metal-to-metal seals and seals resistant to chemical and temperature degradation, minimizes leak paths, and provides a compact, slim body configuration providing flexibility in the orientation of downhole hydraulic connections without obstructing the downhole space.

Figure 1:
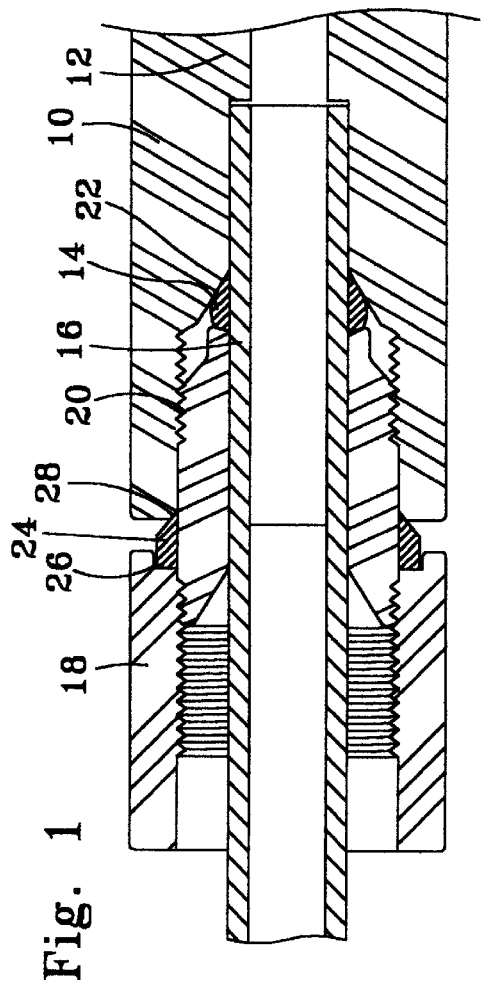
FIG. 1 illustrates a primary retainer engaged with a housing to activate a primary seal and a second seal.

Referring to FIG. 1, one embodiment of the invention is illustrated wherein housing 10 includes recess 12 which forms a hollow space within housing 10. Metal ferrule or seal 14 is incorporated to seal the gap between conduit 16 and housing 10, and is actuated by primary retainer 18 and threadform 20 to engage housing 10. Rotation of primary retainer 18 relative to housing 10 urges seal 14 against conduit 16 and housing bevel 22, forming a tight metal-to-metal seal therebetween to prevent migration of pressurized liquids or gases. When complete, such connection provides a strong mechanical connection between housing 10 and conduit 16 and prevents relative movement in axial and rotational directions.

Second seal 24 is positioned between primary retainer 18 and housing 10 to isolate primary seal 14 from fluids exterior of conduit 16, and to provide backup seal capability for withstanding high fluid pressures on either side of the seal system. Second seal 24 can be initially retained within recess 26 to facilitate assembly of the components, and is illustrated as contacting bevel surface 28 of housing 10. Second seal 24 is sufficiently deformable to permit an effective seal against bevel surface 28 as primary retainer 18 is engaged with housing 20. In a preferred embodiment of the invention, both second seal 24 and primary seal 14 are sufficiently deformable to provide effective seals against the respective sealing surfaces so that irregularities in the manufacture or assembly of primary retainer 18 and housing 10 do not prevent fluid tight sealing effectiveness.

Figure 2:
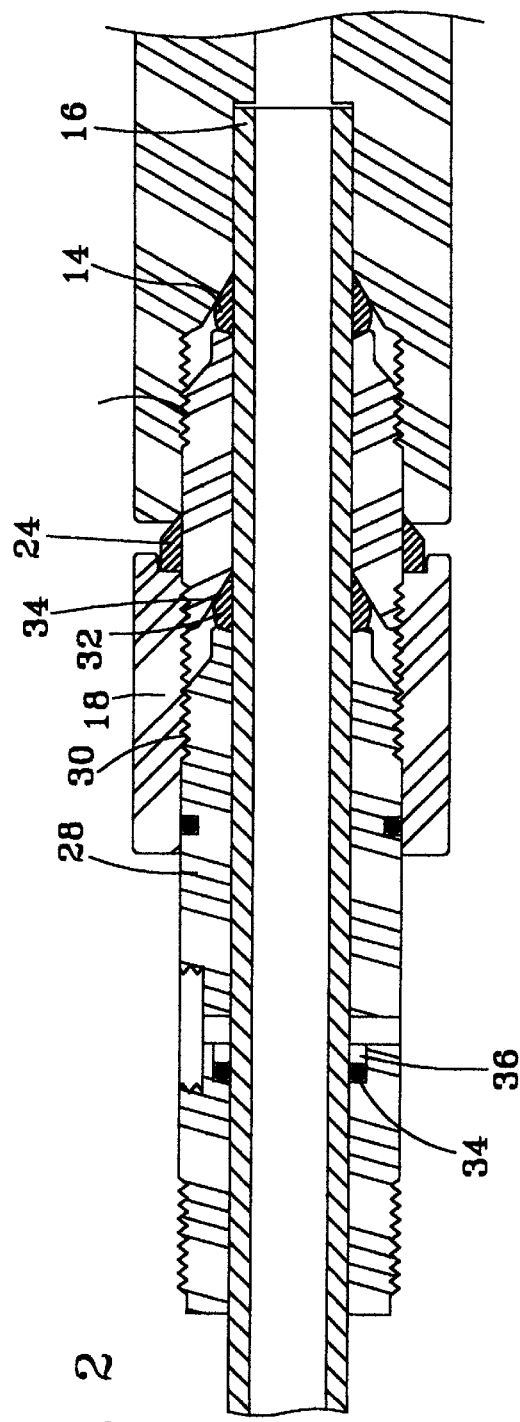
FIG. 2 illustrates a secondary retainer engaged with the primary retainer to activate a third seal.

As shown in FIG. 2, secondary retainer 28 is in threaded engagement with primary retainer 18 through threadform 30 and contacts third seal 32. In one embodiment of the invention, third seal 32 can comprise a metal ferrule which is urged against housing bevel 34. As secondary retainer 28 contacts third seal 32, a metal-to-metal seal connection can be made between secondary retainer 28 and primary retainer 18. In this configuration, third seal 32 provides a secondary or backup sealing function to primary seal 18 through the gap between primary retainer 18 and conduit 16. Another significant function provided by third seal 32 and secondary retainer 28 is that multiple mechanical attachments strengthen the connection between housing 10 and conduit 16. Conduit 16 is retained by the engagement of primary seal 14 and by third seal 32, which provides two gripping contacts against conduit 16 which resist axial thrust forces, and resist rotational and bending moments acting against conduit 16. The dual connection points between the retainers and conduit 16 significantly reduces the impact of vibration forces acting on conduit 16 due to the flow of gas and liquids past conduit 16, to hydraulic fluid forces within conduit 16, and other causes. Such vibration forces can cause fatigue failure of conduit 16 of the connections with conduit 16.

Seals 14 and 32 provide backup sealing functionality and also reduce the possibility of mechanical connection failure caused by fluid pressures or physical movement of conduit 16. Additional retainers can be added to further increase tensile performance of the assembled connector, and this unique function of the invention permits conduit 16 to be used as a hydraulic slick line to support downhole well tools as such tools are lowered into a wellbore with conduit 16. Hydraulic power for actuating such tools can be provided through hydraulic fluid in conduit 16.

Secondary retainer 28 can include elastomeric seal 34 within groove 36 for preventing solids intrusion in the gap between secondary retainer 28 and conduit 16. Aperture 38 can provide transverse access to such gap through secondary retainer 28, and threaded nipple 40 can permit the attachment of additional equipment.

Figure 5:
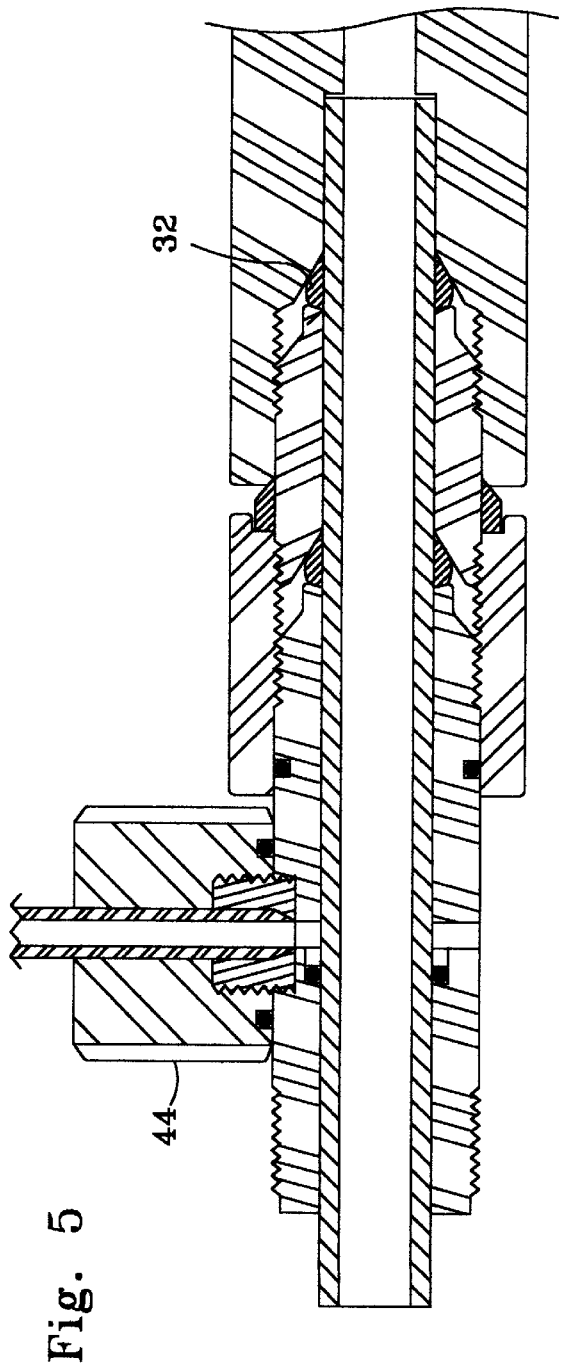
FIG. 5 illustrates a cap ring engaged with the secondary retainer.

FIG. 3 shows a secondary retainer identified as end cap 42 having test apparatus 44 attached thereto to permit the selective pressure testing of seal 14 and third seal 32 after the connections have been made up, but before end cap 42 is tightened to activate ferrule 40. Pressure is provided through aperture 46 in end cap 42. After such pressure testing is completed, test apparatus 44 can be removed, end cap 42 is tightened to activate ferrule 40, and cap ring 48 and seals 50 and 52 can be installed to seal aperture 46 as shown in FIG. 5.

Test apparatus 44 can be used to test the operation of primary or backup seals before the connector is positioned downhole in a well or other relatively inaccessible location. FIG. 5 illustrates another configuration of test apparatus 44 adapted to pressure test the gap between primary retainer 18 and housing 10. In this embodiment of test apparatus 44, second seal 24 and primary seal 14 can be pressure tested before the apparatus is placed into service.

Figure 6:
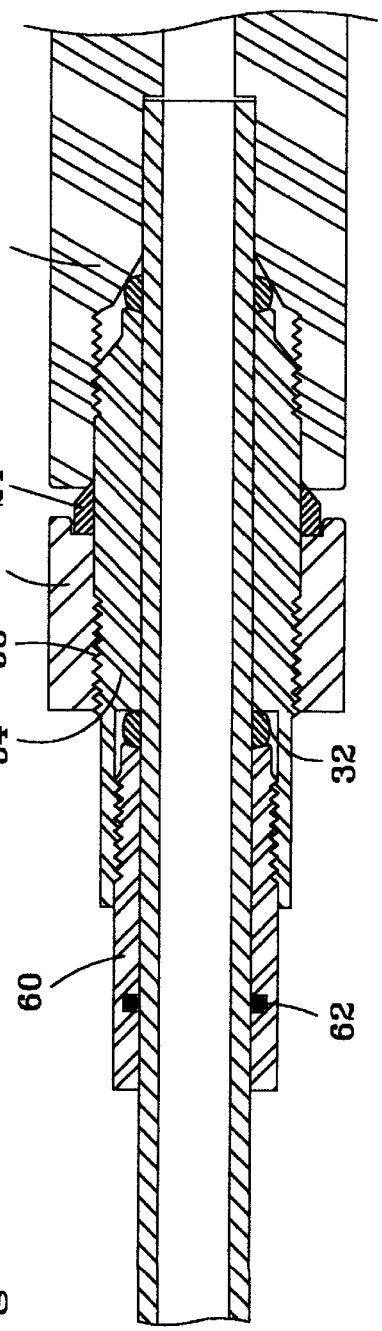
FIG. 6 illustrates a cap ring engaged with the primary retainer for activating the second seal independent of the primary seal activation.

FIG. 6 illustrates another technique for urging second seal 24 against housing 10. In this embodiment of the invention, primary retainer 54 urges primary seal 14 against housing 10. Cap ring 56 is threadably engaged through threadform 58 to primary retainer 54, and can be moved to permit tightening of second seal 24 independent of the tightening of primary seal 14. A secondary retainer such as end cap 60 can urge third seal 32 against primary retainer 54 to provide the backup sealing capabilities and mechanical connection functions previously described. Seal 62 can limit solids intrusion.

FIG. 7 illustrates an expanded view for one embodiment of the invention. A primary retainer such as primary jam nut 64 cooperates with ferrule set 66 to provide a primary seal against housing 10. Front ferrule 68 and back ferrule 70 cooperate with tertiary jam nut 72 to provide a seal between primary jam nut 64 and housing 10. Ferrule set 74 cooperates with secondary retainer such as secondary jam nut 76 to provide a seal between conduit 16 and primary jam nut 64. Optional O-rings 78 and 80 can provide additional sealing capability between secondary jam nut 76 against primary jam nut 64 and conduit 16 respectively.

FIG. 8 shows the elements in FIG. 7 after such elements have been engaged to provide the respectively sealing functions. FIG. 9 illustrates an end view showing splined outside surfaces for primary jam nut 64 and for secondary jam nut 76. Wrench 82 having splined wrench fingers is engaged with the splined outside surface of secondary jam nut 76 to permit rotatable engagement or disengagement of the components. This spline configuration permits two connectors to be placed closely together, unlike conventional jam nuts fitting box end or crescent style wrenches.

Seals 24 and 32 can be formed with metal or with other materials resistant to degradation induced by pressurized fluids in a wellbore or other environmental source exterior of conduit 16. By providing backup seal capabilities, dual metal-to-metal sealing capabilities can be formed, or seal combinations of elastomers, plastics, and other seal materials can be formed. The invention uniquely provides test apparatus capabilities for testing all potential leak paths before the connection is placed into service. In particular, the test apparatus permits high fluid pressure exterior of the conduit to be tested, thereby modeling the actual conditions downhole in a wellbore.

A significant feature of the invention is the compact, slimhole function provided by the combination of seals and retainers. The radial diameter (or similar dimension for noncylindrical configurations) of the primary retainer is preferably equal to or less than the radial diameter of the connector housing, and the radial diameter of the secondary retainer is preferably equal to or less than the radial diameter of the primary retainer. This unique feature of the invention eliminates potential restrictions within confined spaces and permits transverse and other orientations downhole in a wellbore and in other confined spaces.

The invention provides the functional benefits of providing a vibration and shock resistant tubing connection while maintaining fluid tight seal capabilities. This combination reduces manufacturing and installation costs, and uniquely incorporates two functions within a single tool.

Although the present invention can be used in numerous applications at the surface, underwater, and in space, the present invention is particularly useful in the confined, high pressure environment downhole in a well. The invention provides a high pressure connector which is small in diameter and can provide metal-to-metal seals at all relevant interfaces. Although the invention works with metal-to-metal seals, the invention is equally applicable to components formed with plastics, composite materials, and other compounds as previously described. Additionally, the invention provides redundant seal capability without significantly increasing the size or cost of the connector. Gases and liquids are prevented from flowing into or out or conduit 16. The invention has been described for use with a connector between adjacent conduit sections, but is equally applicable for making the connection between a conduit and a downhole well tool. The apparatus components are described for hydraulic line connectors but are also interchangable with connectors for electrical conductors such as I-wires.

The invention is useful for many different applications and is particularly suited to downhole well tools, tubing hangers, subsea test trees and production trees, and other uses requiring hydraulic control in small spaces or distant locations. Other representative applications include but are not limited to safety valve connections, chemical injection valve connections, tubing hanger connections, drill stem testing tools, and others. The apparatus can provide pressure ratings exceeding 15,000 psi and tensile ratings for hydraulic tubing of 300 lbs. The apparatus provides long term reliable service and mean time between failures due to redundant metal-to-metal seals and due to the ability to pressure test at the wellbore surface before installation.

Although the invention has been described in terms of certain preferred embodiments, it will become apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. A high pressure connector for engagement with a conduit operable in contact with a pressurized fluid comprising:

a housing having a recess for receiving the conduit;

a primary seal for contacting said housing and the conduit;

a second seal for contacting said housing;

a primary retainer enviable with said housing for anchoring the conduit to said housing by urging said primary seal into contact with said housing and the conduit to prevent fluid migration therebetween, and for engaging said secondary seal to prevent fluid migration between said primary retainer and said housing;

a third seal for contacting the conduit and said primary retainer and for isolating said primary seal from the pressurized fluid;

a secondary retainer engagable with said primary retainer for urging said third seal into engagement with the conduit and said primary retainer; and a moveable ring for separately urging said second seal against said housing independent of the engagement of said primary retainer with said primary seal and said connector.

2. A high pressure connector for engagement with a conduit operable in contact with a pressurized fluid, comprising:

a housing having a recess for receiving the conduit;

a primary seal for contacting said housing and the conduit;

a second seal for contacting said housing;

a primary retainer engagable with said housing for anchoring the conduit to said housing by urging said primary seal into contact with said housing and the conduit to prevent fluid migration therebetween, and for engaging said secondary seal to prevent fluid migration between said primary retainer and said housing;

a third seal for contacting the conduit and said primary retainer and for isolating said primary seal from the pressurized fluid;

a secondary retainer engagable with said primary retainer for urging said third seal into engagement with the conduit and said primary retainer; and a test attachment engagable with said secondary retainer for permitting the pressure testing of the seals provided by said third seal and said primary seal.

3. A high pressure connector as recited in claim 2, wherein said test attachment is detachable from said secondary retainer.

4. A high pressure connector as recited in claim 2, wherein said test attachment is engagable with a high pressure fluid source capable of contacting said third seal with a high pressure fluid.

5. A high pressure connector for engagement with a conduit operable downhole in a wellbore containing a pressurized fluid, comprising:

a housing having a recess for receiving the conduit;

a metallic primary seal for contacting said housing and the conduit;

a second seal for contacting said housing;

a primary retainer engagable with said housing for anchoring the conduit to said housing by urging said primary seal into contact with said housing and the conduit to prevent fluid migration therebetween and for urging said second seal against said housing to prevent fluid migration between said primary retainer and said housing;

a third seal for contacting the conduit and said primary retainer and for isolating said primary seal from the pressurized fluid;

a secondary retainer engagable with said primary retainer for urging said third seal into engagement with the conduit and said primary retainer; and a test attachment detachably engagable with said apparatus for testing the effectiveness of the seal provided by said primary seal.

6. A high pressure connector as recited in claim 5, wherein said second seal and said third seals are metallic.

7. A high pressure connector as recited in claim 5, wherein said test attachment is capable of testing said primary seal and said second seal.

8. A high pressure connector as recited in claim 5, wherein said test attachment is capable of testing said primary seal and said third seal.

9. A high pressure connector as recited in claim 8, wherein said test attachment is engagable with a high pressure fluid source capable of contacting said third seal with a high pressure fluid.

10. A high pressure connector as recited in claim 5, wherein said second seal and said third seal are resistant to degradation induced by the pressurized fluid.

11. A high pressure connector as recited in claim 5, wherein said primary retainer has a radial diameter equal to or less than the radial diameter of said connector.

12. A high pressure connector as recited in claim 6, wherein said secondary retainer has a radial diameter equal to or less than the radial diameter of said primary retainer.

13. A high pressure connector as recited in claim 5, wherein said secondary retainer resists vibration induced damage to the conduit.

* * * * *